H. O. SMITH.
FASTENER.
APPLICATION FILED FEB. 16, 1921.
1,409,069. Patented Mar. 7, 1922.
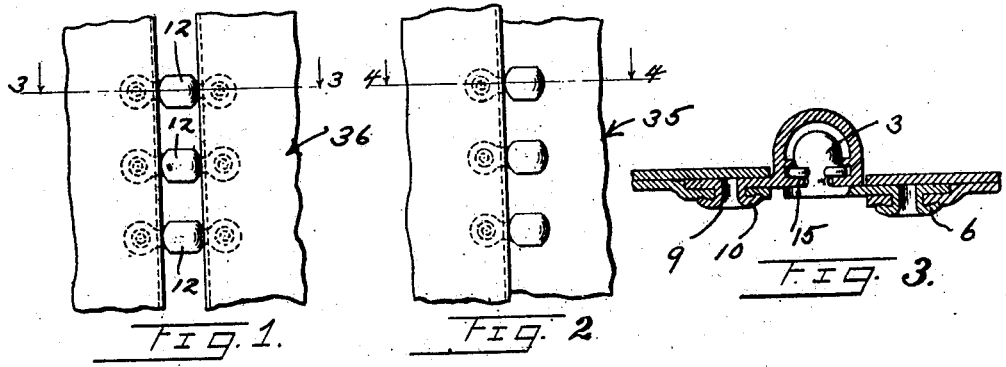
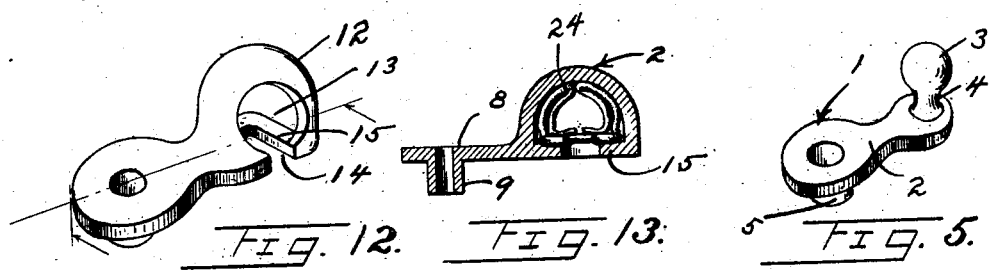
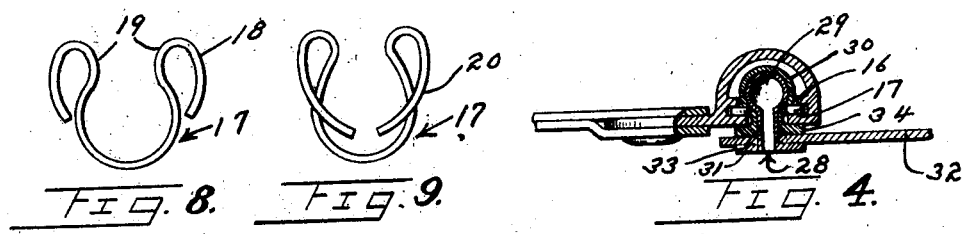
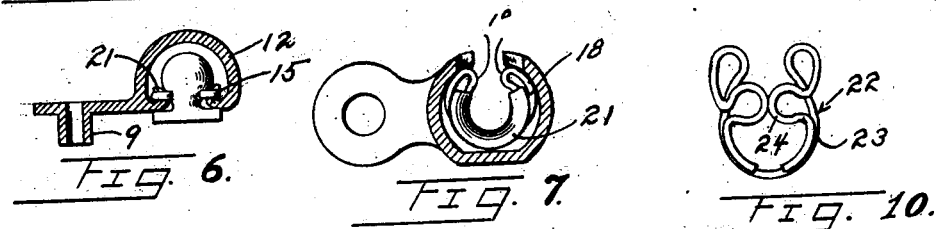
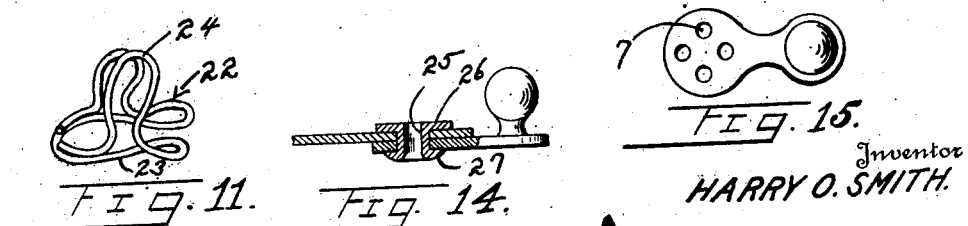
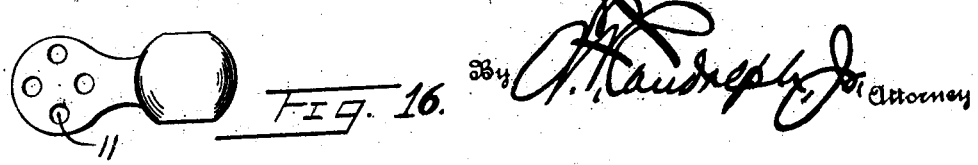
Inventor
HARRY O. SMITH.

UNITED STATES PATENT OFFICE.

HARRY O. SMITH, OF LOS ANGELES, CALIFORNIA.

FASTENER.

1,409,069.   Specification of Letters Patent.   Patented Mar. 7, 1922.

Application filed February 16, 1921. Serial No. 445,376.

*To all whom it may concern:*

Be it known that I, HARRY O. SMITH, a citizen of the United States, residing at Los Angeles, in the county of Los Angeles and State of California, have invented certain new and useful Improvements in a Fastener; and I do hereby declare the following to be a full, clear, and exact description of the invention, such as will enable others skilled in the art to which it appertains to make and use the same.

This invention relates to new and useful improvements in fasteners of the character illustrated, described and claimed in my United States Letters Patents numbered 1,273,100 and 1,341,600 and has for its primary object the provision of means for effectively securing a spring in the female member so as to permit the same to firmly grip the male member when inserted in the female member.

Another object of this invention is the provision of means whereby the male and female members may be firmly attached to articles, such as uppers of shoes, leggins, raincoats, automobile curtains, or wherever it is desired to detachably connect two members together at their adjoining edges.

A further object of this invention is the provision of a fastener of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a plan view, illustrating my invention applied to members that are to be held against separation, Figure 2 is a similar view illustrating the application of my invention to members that have their edges in overlapped relation, Figure 3 is a sectional view, taken on the line 3—3 of Figure 1, Figure 4 is a similar view taken on line 4—4 of Figure 2, Figure 5 is a perspective view illustrating the male member used in Figure 1, Figure 6 is a vertical sectional view, illustrating the means of securing a spring in the female member, Figure 7 is a horizontal sectional view illustrating the same, Figures 8 and 9 are plan views, illustrating springs to be used in the female members of Figures 3, 6, and 7, Figure 10 is a plan view, illustrating a modified form of spring, Figure 11 is a perspective view illustrating the same, Figure 12 is a perspective view illustrating the female member to receive the spring as shown in Figures 10 and 11, Figure 13 is a sectional view of said last female member with the spring shown in Figures 10 and 11 positioned therein, Figure 14 is a sectional view illustrating a modified form of means of securing the male member to an article, Figure 15 is a plan view illustrating another modified form of means for attaching the male member to the article.

Figure 16 is a similar view illustrating the last named securing means applied to the female member.

Referring in detail to the drawings, the numerals 1 and 2 indicate male and female members respectively and one form of the male member, consists of an elongated base 2 having a ball or sphere 3 connected to one end thereof by a shank or neck 4. The base 2 may have a portion of the material thereof pressed out therefrom to form a tubular rivet 5 which is adapted to be passed through the article to which the male member is to be attached and upset as shown at 6 or the base may have a series of openings 7 to receive a thread several times for securing the base to the article by the thread.

The female member 2 consists of a base 8 similar in shape to the base 1 of the male member and has a portion of its material pressed out therefrom to provide a tubular rivet 9 adapted to be passed through the article and headed or upset as shown at 10. The base 8 may have a series of openings 11 instead of the rivets for receiving a thread several times as heretofore described in reference to the male member. A dome-shaped member 12 is formed on the base 8 and has an opening 13 in its front wall and a slot 14 in its bottom wall that communicates with the opening 13 to receive the ball or sphere 3 of the male member 1. The shank 4 of said male member is received by the slot 14 and the latter cooperates with the walls of the dome-shaped member 12 in forming a retaining flange 15. An upper flange 16 is formed in the dome-shaped member and spaced from the flange 15 to permit a spring 17 to be held within the dome-shaped member by said flanges. The spring 17 as shown in Figures 3, 4, 6 and 7 may be shaped as shown in Figures 8 and 9. The spring shown in Figure 8 is substantially U-shaped and has its ends curved outwardly and rearwardly as illustrated at 18 to form tension creating portions adapted to bear against the wall of the dome-shaped member when positioned therein so as to position the end portions 19 outwardly beyond the flange 15 to engage and grip the male member or the shank thereof when said male member is inserted within the female member.

The spring shown in Figure 9 is of substantially U-shape and has its ends curved outwardly, rearwardly and inwardly over the U-shaped portion as illustrated at 20.

The springs shown in Figures 8 and 9 may be secured within the dome-shaped member 12 as shown in Figures 6 and 7. In this form of my invention, the outer flange 15 has formed thereon an inner retaining flange 21 which is adapted to be bent over the spring 17 and is of substantially U-shape and its ends terminate spaced from the front wall of the dome-shaped member 12 or the opening 13 thereof so as to expose the gripping portions 19 of said spring.

Figures 10 and 11 illustrate a modified form of spring designated in entirety by the reference character 22 and consists of a substantially U-shaped base 23 and a crown portion 24. The crown portion 24 forms an integral portion of the substantially U-shaped base portion 23. The base portion 23 is adapted to be positioned within a female member as shown in Figure 12 with the base portion 23 resting upon the flange 15 and the crown portion 24 engaging the sides and top wall of said dome-shaped member 12 as illustrated in Figure 13.

Instead of having an integral rivet formed on the bases of the male and female members, the rivet 25 may be separate from the bases and is provided with a head 26 and after the rivet has been passed through the article and through an opening formed in the base of either the female or male members, the rivet is headed as illustrated at 27 of Figure 14. Figure 14 illustrates this form of securing means applied to the male member, however, it is clearly apparent that the same may be applied to the base of the female member.

Figure 4 shows a modified form of male member 28 that includes inner and outer balls or spheres 29 and 30, each having a neck 31. The neck 31 of the inner ball or sphere 29 is of a greater length than the neck of the outer ball or sphere 30 and is adapted to extend through the article 32 and flanged as shown at 33 while the neck 31 of the outer ball or sphere 30 is of a shorter length and provided with a flange 34 adapted to engage in opposite face of the article 32 from that engaged by the flange 33. The form of male member shown in Figure 4 is to be used upon an article 35 as shown in Figure 2 where the adjacent edges of the article are arranged in overlapping relation and this form of male member may be used in conjunction with any of the forms of female members and springs heretofore described and illustrated in the drawings.

In Figure 1 I have shown an article 36 in which the edges thereof are arranged in spaced relation and any of the forms of male and female members shown in the drawings, except the form of male member shown in Figure 4 may be used to attach the edges of the article 36 together. The article 36 as shown in Figure 1 may be the upper of a shoe of the lacing type while the article shown in Figure 2 may be the upper of a shoe of the button type that is, the edges of the upper arranged in overlapping relation, however, my invention may be used on any article wherever it is desired to detachably connect the adjoining edges of the article.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A fastener including male and female members, said female member having a dome shaped portion provided with an opening in its front wall and a slot in its bottom wall, said opening and slot having communication with each other, a flange formed in the dome-shaped member, and a spring including a U-shaped portion and a crown portion positioned within the dome-shaped member with the U-shaped portion resting upon said flange and with the crown portion in engagement with the side and top walls of the dome-shaped portion.

2. A fastener including male and female members, said female member having communicating openings in its front and bottom walls, a seat in said female member, and a spring in said female member and including horizontal and side portions, said horizontal portion resting on the seat and the side portions engaging the side walls of the female member.

3. A fastener including male and female members, said female member having a dome-shaped portion provided with communicating openings in its front and bottom walls, a seat in said female member, a spring including a U-shaped portion, and side portions in said female member and having its U-shaped portion resting on the seat and with its ends disposed adjacent the opening in the front wall of said female member, said side portions contacting with the sides of the female member and curved to conform thereto.

In testimony whereof I affix my signature in presence of two witnesses.

HARRY O. SMITH.

Witnesses:
 F. H. SEIFERT,
 F. A. THOMA.